Nov. 4, 1930.  C. L. MATTISON  1,780,203
FEED CONTROL MEANS FOR TURNING MACHINES
Filed July 5, 1928  2 Sheets-Sheet 1
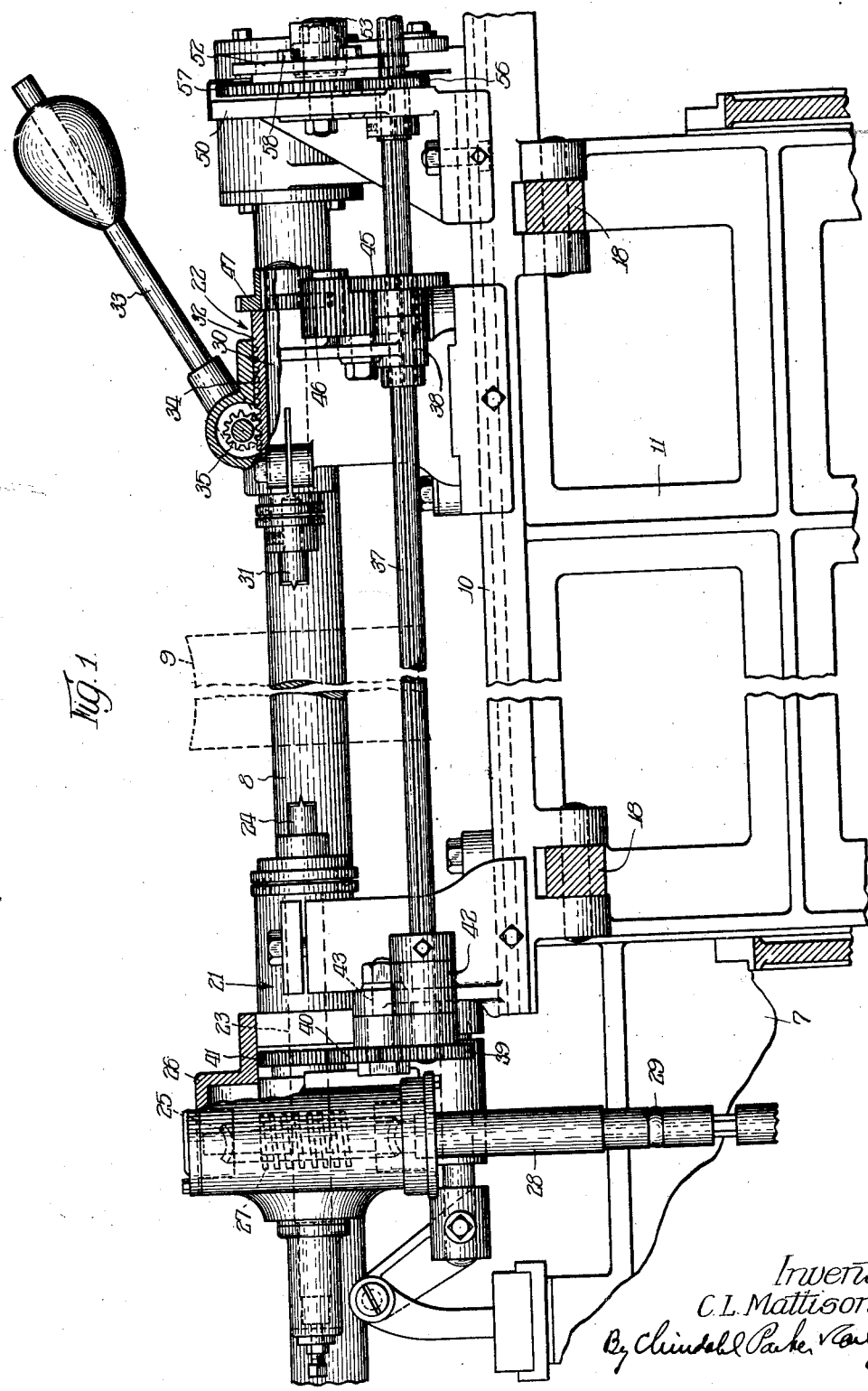
Inventor:
C. L. Mattison,
By Chindahl Parker Carlson
Attys

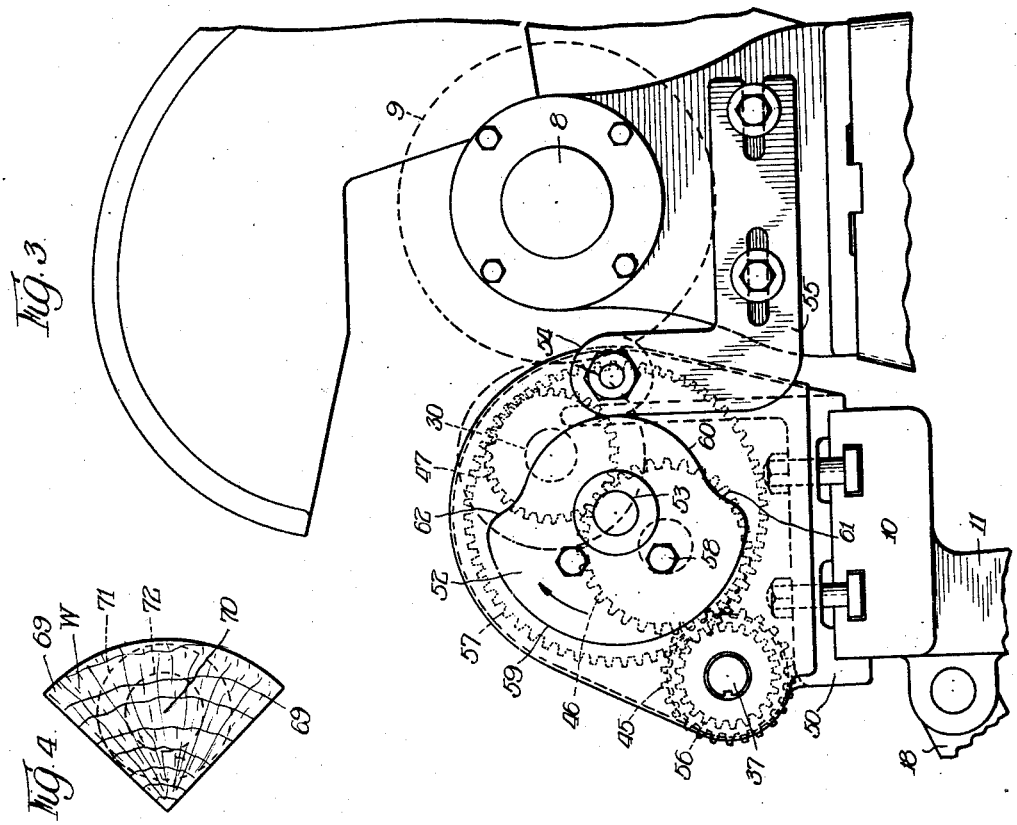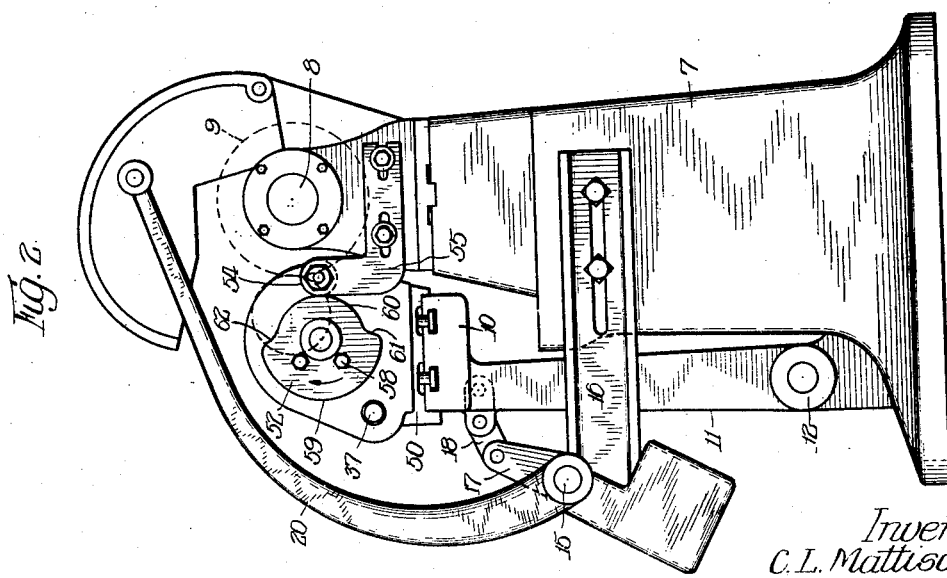

Patented Nov. 4, 1930

1,780,203

UNITED STATES PATENT OFFICE

CARL L. MATTISON, OF ROCKFORD, ILLINOIS, ASSIGNOR TO MATTISON MACHINE WORKS, OF ROCKFORD, ILLINOIS, A CORPORATION OF ILLINOIS

FEED-CONTROL MEANS FOR TURNING MACHINES

Application filed July 5, 1928. Serial No. 290,474.

The invention relates generally to turning machines such for example, as are used for turning wood.

Machines of this character which are used for production work are generally provided with a rapidly rotating cutter arranged to operate upon a slowly rotating work piece to remove material from the periphery thereof. With such a machine the work is fed toward the rapidly rotating cutter until the cutter has reached the desired depth of cut, this depth being ordinarily determined by suitable stop means interposed between the cutter and work supporting frames. This particular movement of the cutter and the work piece relative to each other will hereinafter be termed "feeding the cutter to depth." After the cutter has reached its depth, the rotation of the work piece through a single revolution, causes the cutter to remove stock from the periphery of the piece down to this particular depth.

The feeding of the work to the cutter and in to depth is normally governed manually by the operator and in case the work is fed too rapidly to depth, many undesirable results may occur. In some instances the work piece is thrown from between the two work centers which of course endangers the operator as well as the machine. In other cases, too rapid feeding of the work results in tearing the work, breaking of the cutter head or cutter knives or in excessive dulling of the knives.

This is particularly true when work is being turned from rough pieces of stock, as, for example, from quarter-round stock of the type used for the production of bowling pins. For this purpose it is the practice to use work pieces formed by quartering an unstripped hard maple log and it will be apparent that when such a blank is centered between the spindles there will be corners which project beyond the body of the piece. The feed to depth may occur between two of these projecting corners and as a result the sudden contact of the knives with an exceedingly heavy cut may cause breaking of the knives, and tearing or splitting of the stock. In such cases the operator often becomes unduly cautious after experiencing such difficulties and hence wastes a considerable amount of working time by feeding the cutter to depth too slowly.

One object of the present invention is to provide a turning machine embodying means of a novel character operable to control the feeding of the work to depth so that an initial or roughing cut of stock may be removed from the periphery of a rotating work piece and after such an initial cut has been made to control the feeding of the work to a second depth of cut so that a second layer of substantially uniform thickness may be removed from the work piece to produce an accurately turned piece of work. This makes possible cutting of the maximum amount of stock which may be safely removed at all times during the turning operation without undue danger to the operator or to the machine.

It has also been found that, due primarily to the fact that the cut is made on the side opposite from the operator, it is impossible for the operator to determine accurately when the cutting operation is completed and the work piece is often held in its operative position adjacent the cutter for considerable time after the completion of the cutting operation. During this time the finished work piece continues to rotate and the cutting edges of the cutter knives rub against the finished surface thereof which results in burning the work piece and heating the knives so as to remove the temper therefrom.

Another object is to provide a turning machine embodying means operable to institute the withdrawal movement of the work table and positively move the work out of contact with the cutter upon the completion of the cutting operation so as to determine definitely the time necessary for completion of the turning operation and to prevent injury to the knives and to the work piece due to continued contact of the two after completion of the cutting operation.

Another object is to provide a turning machine of this character having means operable to signal the operator upon the completion of the cutting operation so that he may without loss of time move the work supporting frame to its inoperative position and remove the finished work piece and position a new piece of work thereon.

Other objects and advantages will become apparent from the following description taken in connection with the accompanying drawings in which:

Figure 1 is a fragmentary front elevational view partially in section of a wood turning machine embodying the preferred form of the invention.

Fig. 2 is an end elevational view of the machine shown in Fig. 1.

Fig. 3 is an enlarged portion of the machine shown in Fig. 2.

Fig. 4 is a diagrammatic view illustrating the limits of the roughing and finishing cuts taken from a piece of stock in the operation of the preferred form of machine shown in Figs. 1 to 3.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claim.

The machine chosen for purposes of illustration is of the type which embodies a stationarily mounted rotating cutter head and a swingable work table movable to and from operative relation with the cutter. A main frame or base 7 is provided on which a cutter spindle 8 is rotatably mounted and carries a cutter 9 shown in dotted outline in the drawings. The work is supported upon a movable table 10 mounted for movement between an operative position adjacent the cutter 9 to an inoperative position remote from the cutter. The table 10 is carried on the upper end of an upright frame 11 having its lower end pivotally supported by suitable bearings 12 (Fig. 2) on the forward side of the base 7.

For swinging the table 10 toward and away from the frame 7 to move the work to and from the cutter a rock shaft 15, supported at a substantial distance from the frame 7 upon forwardly extending brackets 16 secured to the frame 7, has a pair of lever arms 17 secured thereto which are pivotally connected to the upper end of the frame 11 by means of a pair of links 18. At one end of the shaft 15 an operative arm or lever 20 is secured whereby the shaft 15 may be rocked and the table 10 moved toward and away from the cutter 9.

Upon the table 10 are supported a head stock 21 and a tail stock 22 adapted for adjustment in a well known manner. The head stock comprises a spindle 23 at the forward end of which is secured a spur center 24 and near the rear end of which is secured a worm wheel 25 enclosed within a suitable housing 26. Within the housing 26 a worm 27 is also mounted, meshing with the worm wheel 25, and secured to the upper end of an upright driving shaft 28 which is connected to a source of power (not shown) by means of a suitable universal coupling 29 so as to permit swinging movement of the table 10.

The tail stock 22 comprises a spindle 30 carrying on its inner end a spur center 31. As herein shown the spindle 30 is mounted in the tail stock bearing by means of a sleeve 32 which is arranged to be reciprocated to move the spur center 31 by means of a lever 33 which is geared by means of a pinion 35 to a rack 34 formed on the sleeve 32.

In the present embodiment a shaft 37 is mounted on the table 10 parallel to the spindles in spaced bearings 38 and 42 and is geared to the spindles 23 and 30 by similar gear trains 39, 40, 41 and 45, 46, 47 so that the two spindles will rotate in synchronism. The gear 45 is splined to the shaft 37 so as to permit longitudinal adjustment of the tailstock.

To control the relative movement of the work piece and the cutter when the cutter is fed to depth, means is provided which is preferably operated in timed relation to the work driving means to govern the initial feed to depth so as to remove an initial or roughing cut of material from the periphery of the stock and thereafter to govern a second feeding to depth so as to remove a second layer of material which will of course be of a more uniform thickness due to the initial or roughing operation previously performed.

Thus in the present embodiment of the invention a bracket 50 is mounted on the table 10 adjacent the tailstock end thereof and a cam member in the form of a disk 52 is rotatably mounted thereon by means of a stud 53 secured in the bracket. The cam member 52 is arranged to engage at its edge with a roller 54 adjustably supported on the main frame 7 by an L-shaped bracket 55 so as to definitely limit the movement of the table 10 toward the cutter 9.

The cam member 52 is preferably arranged for rotation in timed relation to work supporting spindles 23 and 30 through the medium of a pinion 56 fixed on the shaft 37 and engaging a gear 57 rotatably mounted on the stud 53, the cam member being secured to the gear 57 by headed screws 58. Thus it will be apparent that since the engagement of the cam member 52 with the roller 54 definitely limits the travel of the work piece toward the cutter during the feeding of the cutter to depth, the shape of the cam member may be varied to produce any desired combination of feeding in movements of the work.

The present embodiment of the invention contemplates the completion of the turning operation by making two successive cuts about the periphery of the work blank. To this end a dwell portion 59 is formed on the cam member 52 concentric with the axis of rotation of the cam member and when the turning operation is started it is contemplated that one end of this surface (the upper end as shown in the drawings) will be positioned so as to be engageable with the cam roller 54.

The work is positioned between the work spindles while they are in inoperative position remote from the cutter and the operator then pulls the handle 20 to move the table toward the cutter 9 to feed the cutter to depth in the work piece, this depth being determined by contact of the dwell surface 59 with the roller 54. During such movement, the rotation of the work spindles may be initiated by any preferred manual or automatic means (not shown) and after the roller 54 has engaged the dwell surface 59, the work is rotated once so that a roughing cut of material will be removed from the periphery of the blank by the cutter 9.

The geared connection between the shaft 37 and the work spindles is proportioned so that the dwell surface 59 will remain in contact with the roller 54 until the work has been rotated sufficiently to complete the initial or roughing cut and an inwardly sloping cam surface 61 is provided on the cam member 52 arranged to engage the roller 54 after the completion of the roughing cut to permit the feeding of the cutter to a second depth in the work piece. To cause such a second feeding of the cutter to depth, the operator continues to apply pressure to the handle 20 to move the table 10 toward the cutter and the depth to which it is fed into the work piece is determined by engagement of the roller 54 with a dwell surface 60 on the cam member 52 continuing from the inner end of the cam surface 61.

The rotation of the work continues during and after the second feeding of the cutter to depth and the dwell surface 60 is of sufficient extent so that the work piece is given one complete revolution while the table is held stationary and a second or finishing cut is removed from the periphery of the work piece.

It will be noted that the second or finishing cut is of substantially uniform depth entirely around the periphery of the work piece due to the previous removal of the initial roughing cut. This is best illustrated in Fig. 4 which shows diagrammatically a work piece W of the type used in producing bowling pins. The work piece which is formed by quartering a maple log, has projecting corners 69 and is centered at 70. At the completion of the first feeding to depth, the work piece is moved through one complete revolution and the cutter removes material from periphery of the work piece down to the dotted circle 71. After the completion of the initial cut down the dotted circle 71, the cutter is again fed to the second depth and as the work piece is turned through another complete revolution the cutter removes the stock down to the line indicated by the dotted circle 72 thus producing a finished work piece.

In order to prevent loss of working time, excessive dulling of the knives and burning of the work due to keeping the work in contact with the cutter after completion of the cutting operation, a cam surface 62 is formed on the cam member 52 leading outwardly from the dwell surface 60 and connecting to the dwell surface 59. The dwell surface 60 is of sufficient length so that the work piece may be moved through a complete revolution after the second feeding of the cutter to depth and after the completion of the finishing cut the outwardly leading cam surfaces 62 engages the roller 54 so as positively to force the finished work piece away from the knives.

In the present embodiment this positive actuation of the work table by the cam surface 62 moves the operating handle 20 which is continuously held by the operator and thus serves to signal the operator so that he may fully retract the table and without loss of time remove the finished work piece and position a new piece of work between the spindles.

From the foregoing it will be apparent that the invention provides a turning machine which may be used for high speed production work without undue danger to the operator or to the machine since automatically operable means is provided to so limit the initial feeding of the cutter to depth that it cannot take a heavy cut into a rough work piece such as would ordinarily tear the stock or break the cutter knives.

Furthermore, the provision of means to limit the amount of stock taken off during a number of successive cutting operations about the periphery of the work piece makes possible the taking off of the maximum safe amount of stock during each revolution of the work and makes the efficiency and the safety of the operation practically independent of the skill of the operator. Thus a more unskilled class of help may be used so as to reduce the cost of the finished work. The provision of means to secure the above mentioned mode of operation also serves to determine definitely the time required for the completion of a turning operation and results in a higher rate of production.

It will also be apparent that since the control means is operable to limit the initial feeding of the cutter to depth, this feeding operation may be accomplished more quickly than heretofore and still with utmost safety, with a consequent saving of operating time.

The provision of means to signal the operator when the cutting operation is completed also prevents loss of operating time and results in greater production. The signalling means automatically institutes the withdrawal movement of the work from the cutter and also prevents the production of burned work pieces and undue dulling of the cutter knives with a resultant saving of expense.

I claim as my invention:

A lathe comprising a cutter and a work support one mounted so as to be movable with respect to the other through a substantial range, manual means for imparting said movement, a combined cam and pattern device, an abutment engaged thereby to govern a certain inner portion of said range, said cam device comprising a succession of pattern contours in radially stepped relation to each other, the engagement of which with said abutment determines the pattern of the cross-section of the work then being cut, while the steps or pronounced portions of the cam provide comparatively abrupt shifts of distance between the work and cutter, the angular pattern dimension of the cam of greater radius being sufficiently prolonged to control the complete cross-section of the work then being cut and so that when its engagement with the abutment is repeated its advance portion having spaced the cutter and work they remain spaced long enough to afford the operator full opportunity to manually complete the range of withdrawal movement.

In testimony whereof, I have hereunto affixed my signature.

CARL L. MATTISON.